United States Patent [19]

Mullally

[11] Patent Number: 5,199,459
[45] Date of Patent: Apr. 6, 1993

[54] DUAL SERIES VALVE

[75] Inventor: Michael J. Mullally, Clifton Springs, N.Y.

[73] Assignee: Valve Tech, Inc., Phelps, N.Y.

[21] Appl. No.: 865,291

[22] Filed: Apr. 8, 1992

Related U.S. Application Data

[62] Division of Ser. No. 697,647, May 8, 1991, Pat. No. 5,150,879.

[51] Int. Cl.⁵ .............................................. F16K 31/02
[52] U.S. Cl. ................................. 137/613; 251/129.21
[58] Field of Search ..................... 251/129.21; 137/613

[56] References Cited

U.S. PATENT DOCUMENTS

| | | |
|---|---|---|
| 3,653,630 | 4/1972 | Ritsema . |
| 4,187,987 | 2/1980 | Raue . |
| 4,326,696 | 4/1982 | Ishikawa et al. . |
| 4,638,973 | 1/1987 | Torrence . |
| 4,647,008 | 3/1987 | Shirai et al. . |
| 4,655,249 | 4/1987 | Livet . |
| 4,696,379 | 9/1987 | Yamamoto et al. . |
| 4,783,009 | 11/1988 | Coates . |
| 4,821,774 | 4/1989 | Chorkey . |
| 4,867,111 | 9/1989 | Schneider et al. . |
| 4,875,658 | 10/1989 | Asai . |
| 4,896,860 | 1/1990 | Malone et al. . |
| 4,922,961 | 5/1990 | Maehara . |

*Primary Examiner*—John C. Fox
*Attorney, Agent, or Firm*—Eugene Stephens & Associates

[57] ABSTRACT

A dual series valve is formed with two plungers within a central bore of a solenoid. Each of the plungers is formed with a guide bore that is supported on respective guide members through opposite ends of the guide bore. The guide members are firmly supported from respective plugs in the solenoid bore to prevent the plungers from contacting the central bore of the solenoid. Two of the guide members supporting respective plungers define valve seats that are opened and closed by respective valve seals carried within the guide bores of the two plungers. The valve seats and the valve seals are maintained in alignment with each other within the respective guide bores between the guide members supporting opposite ends of the plungers.

9 Claims, 3 Drawing Sheets

DUAL SERIES VALVE

This is a division of copending allowed parent application Ser. No. 697,647 filed May 8, 1991, now U.S. Pat. No. 5,150,879 entitled THRUSTER VALVE. The parent application is hereby incorporated by reference.

BACKGROUND

Spacecraft, such as satellites and space probes, are steered by so-called "thruster" engines that are ignited and burned for carefully controlled intervals of time. Separate thruster engines are arranged with respect to the center of mass of the spacecraft to control movement of the craft in three dimensions.

Fuel delivery to the thruster engines is controlled by respective solenoid valves that are normally biased to closed positions for preventing any fuel from reaching the engines. However, when steering is required, one or more of the solenoid valves is energized to an open position for permitting the delivery of fuel to selected thruster engines. The solenoid valves remain energized for limited intervals of time through which the engines effect the desired maneuver.

The thruster engine valves are preferably made as lightweight as possible to help minimize launch weight of the spacecraft. However, redundant parts are sometimes used to assure that the valves close properly to cut off the supply of fuel to the engines. Although the redundant parts add weight to the valve, such redundancy is important because a single thruster engine that fails to shut off can send a satellite into an uncontrolled tumble or into a trajectory that could destroy the craft.

Another requirement that adds weight to the valves is related to the rigors of space flight. Movement of the spacecraft, especially during launch and atmospheric travel, subjects the thruster engine valves to severe vibration and shock. Heavy springs are required to withstand the vibration and shock on the relatively moving parts of the valves for maintaining the valves in a closed position. However, the same spring forces must be overcome by solenoids to open the valve. Accordingly, other weight is added to the valves by increasing the size of the solenoids to overcome the spring forces.

In addition to the special requirements for using the thruster engine valves in space, the valves must also withstand especially aggressive testing procedures before they are used in spacecraft. The valves are cycled, i.e., opened and closed, several thousand times for testing the valves and the engine systems with which they are used. Often the tests are conducted without any fuel passing through the valve. These so-called "dry cycling" procedures subject relatively moving parts of the valves to severe abrasion.

Most of the wear occurs between the relatively moving parts of the solenoid, namely, the solenoid plunger and the bore that guides the plunger. In addition to attracting the plunger toward a pole piece at one end of the bore, magnetic forces of the solenoid also attract the plunger toward the sides of the bore. Over time, repeated energization of the solenoid (i.e., cycling) causes galling between the plunger and bore. Particles worn away by the galling contaminate both the valve and the fuel supply. Within the valve, the particles can accelerate the wear between the plunger and bore or become lodged in positions that prevent the valve from sealing properly to cut off the fuel supply.

Wear between the plunger and bore can also be aggravated by clearance between the plunger and bore. The plunger and bore are relatively dimensioned to provide sufficient clearance between them to allow the plunger to move along the bore. However, it is also desirable to minimize the clearance to prevent the plunger from cocking within the bore, because such cocking can increase wear at the ends of the plunger and more rapidly wear the bore. Cocking can also prevent the valve from closing properly. Although narrow tolerances are desirable to minimize cocking between the plunger and bore, finishing operations, such as honing, that are required to achieve the narrow tolerances within the bore are generally not permissible because of the contamination that they cause. Small particles of the finishing grit and bore stock can become embedded in portions of the bore and resist attempts to clean them out. However, the same particles can dislodge during use of the valve and cause the same kinds of contamination problems caused by the wear particles.

Accordingly, the bores of the thruster valves are usually made to a wider tolerance than desired by using boring operations that produce larger chips that are more easily cleaned out of the bore. However, even the wider tolerances are difficult to achieve because the bore is made of dissimilar materials (i.e., magnetic and nonmagnetic) along its length having different machining characteristics.

Another way of limiting cocking between the plunger and bore is to increase the length of the plunger with respect to the bore diameter to an aspect ratio of at least 1 to 1. The longer length of the plunger decreases the angular amount that the plunger can cock through a given clearance between the plunger and bore. However, the additional length of the plunger adds weight to the valve. Further, the additional mass of the plunger requires a heavier spring to maintain the plunger in a biased position along the bore, and the heavier spring requires a larger solenoid to overcome the spring force and open the valve.

SUMMARY OF THE INVENTION

My invention provides a thruster valve that is easier to machine to desired tolerances, reduces wear between relatively moving parts, maintains the relatively moving parts in desired alignment, and weighs less than known designs. Instead of guiding a plunger along a bore of a solenoid between an outer diametral surface of the plunger and an inner diametral surface of the bore, the plunger is formed with a guide bore that is supported on respective guide members through opposite ends of the guide bore. Both of the guide members are centered within the solenoid bore and are themselves firmly supported by respective plugs that are mounted within the solenoid bore. One of the guide members also defines a valve seat that is opened and closed by a valve seal carried within the plunger guide bore between the two guide members. Accordingly, both the valve seat and valve seal are maintained in a desired alignment with each other within a common bore that is supported from opposite ends by firmly supported guide members.

The outer diameter of the plunger is made with sufficient clearance from the inner diameter of the solenoid bore so that the plunger does not contact the solenoid bore. This allows the dissimilar materials of the solenoid bore to be machined to a less exacting tolerance and finish. Although the plunger is preferably made from a material different from the material of the two guide members, each may be machined separately to a high tolerance. For example, the plunger can be made of a usual magnetic material, but the guide members are preferably made from a nonmagnetic material that has wear-resistant properties. Accordingly, wear between the plunger and the surfaces on which it is guided is significantly reduced.

The plunger can also be made of a much shorter length for two reasons. First, the tolerances between the inner diameter of the plunger guide bore and the outer diameters of the guide members can be narrowed for machining operations that work the respective homogeneous materials. This reduces the clearance between the plunger guide bore and the guide members within which the plunger can cock. Second, the guide bore diameter of the plunger is much smaller than the diameter of the solenoid bore so that, at the same aspect ratio of the length of the plunger to its mounting diameter, the length of the plunger that is supported on its bore is much shorter than the length of a plunger supported on the solenoid bore. However, it is important that both guide members are firmly supported within the bore to prevent the plunger from cocking together with either guide member from the vibration and shock of space travel.

The shorter length of the plunger directly reduces the weight of my thruster valve. However, the shorter length of the plunger also reduces its mass, requiring a lighter spring to close the valve and a smaller solenoid to open it. Thus, the weight of my valve is also reduced by requiring a smaller solenoid to operate it.

Since both the valve seat and the valve seal are aligned within the plunger guide bore between the guide members, any cocking between opposite ends of the plunger on the guide members has a minimal effect on the respective positions of the valve seat and valve seal that are centered within the plunger. Also, any vibration or shock applied to the plunger tends to move the end of the guide member forming the valve seat together with the plunger carrying the valve seal so that the valve parts remain aligned with each other.

Preferably, my thruster valve is configured as a dual series valve having two separate valves that interrupt the same passageway between input and output ports of my valve. Both of the valve seals of the separate valves are normally biased against their respective seats to provide a redundant shutoff of the fuel supply to thruster engines.

My dual series valve includes one or more solenoid coils that are wrapped around a single core. A central bore is formed in the solenoid core having a first plug mounted at one end of the central bore, a second plug mounted at the other end of the central bore, and a third plug dividing the central bore into two portions. Conduits are formed through the first and second plugs interconnecting the two portions of the central bore with respective input and output ports. Another conduit is formed through the third plug interconnecting the two portions of the central bore. Respective passages are defined within the two portions of the central bore between the conduits to complete the single passageway between the input and output ports.

Respective guide members project from the first and second plugs into adjacent portions of the central bore. Another pair of guide members project from opposite ends of the third plug into separate portions of the central bore. A first plunger is formed with a first guide bore that is supported on two of the guide members for movement along the central bore between the first and third plugs. A second plunger is formed with a second guide bore that is supported on the other two guide members for movement along the central bore between the second and third plugs.

Valve seals are carried within the respective guide bores of the two plungers between the two guide members supporting each of the plungers. The seals are used to open and close the respective passages through the two portions of the bore. One of the guide members supporting each plunger also forms a valve seat encompassing an opening in one of the conduits connected to each passage that is opened and closed by the valve seat.

The guide bores in the plunger maintain the respective valve seals and seats in alignment with each other throughout a range of movements of the plungers along the central bore corresponding to positions that open and close the valve openings. Outer surfaces of the plungers are dimensioned with respect to the central bore to provide clearance between the plunger and the central bore. All four of the guide members are firmly supported in the plugs to maintain the plunger out of contact with the bore.

Respective springs are carried within the remaining two guide members that do not form the valve seats. The springs urge the plungers, together with the valve seals, into engagement with the valve seats. Ends of the plugs from which the remaining guide members project are magnetically connected to the solenoid core as respective pole pieces. However, the remaining guide members are dimensioned in length to also function as stops for limiting movement of the plungers toward the respective pole pieces.

Inlet fuel pressure is also used to further bias the valve seals against the valve seats. The respective passages in the two portions of the central bore expose larger areas at one end of the plungers than the other end to the inlet fuel pressure. The areas at the other end of the plungers are diminished by closing the valve openings. Of course, the inlet pressure does not reach the plunger closest to the outlet port unless the the seal carried by the plunger closest to the inlet port leaks or is opened by the solenoid.

DRAWINGS

DETAILED DESCRIPTION

Figure 1:
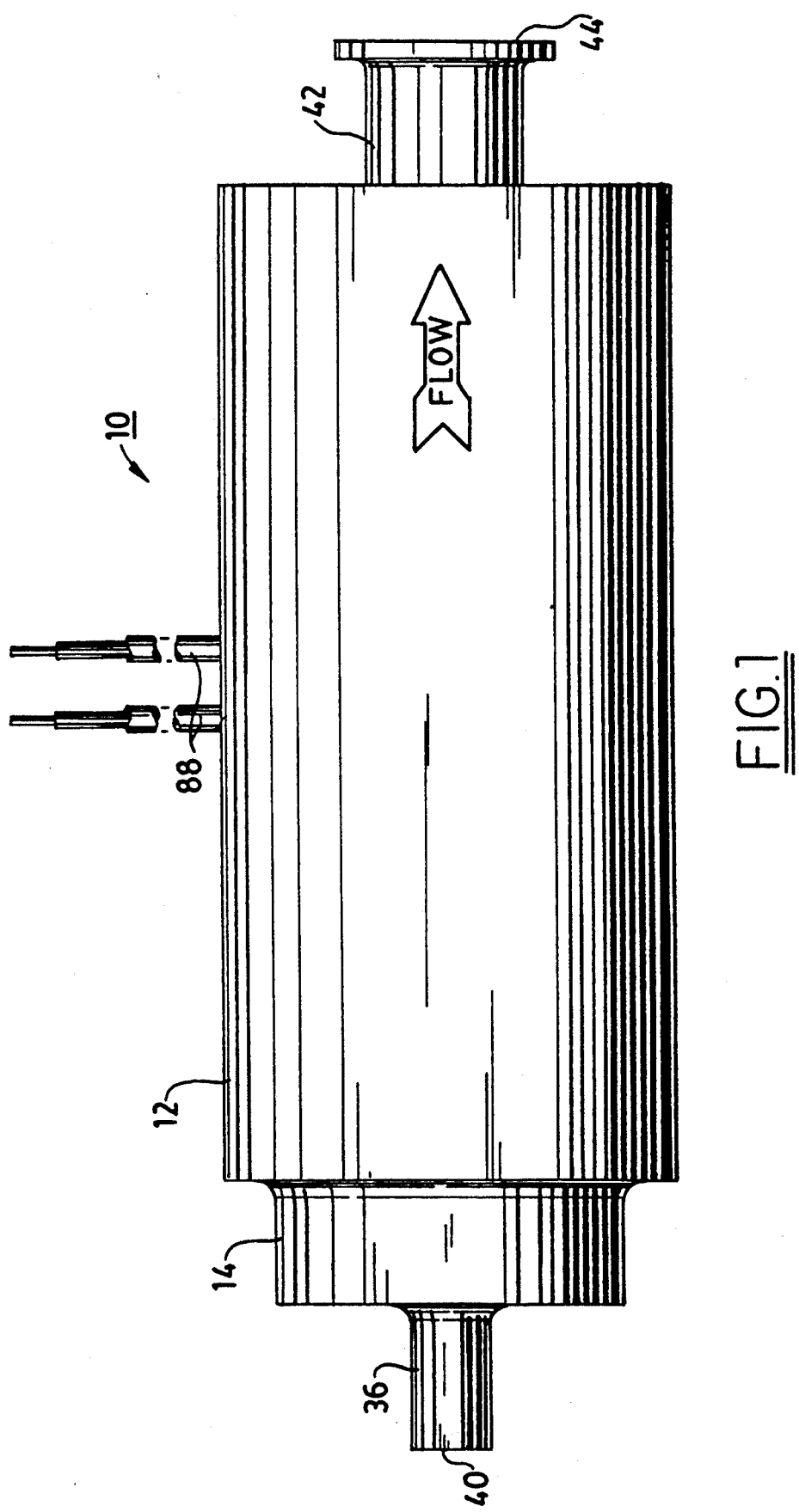
FIG. 1 is a side view of my thruster valve showing the exterior of the valve housing with inlet and outlet ports at opposite ends.

My preferred thruster valve is a dual series valve designated generally at 10 in the three drawing figures. The dual series valve has housing 12 that encloses the internal components of the valve. The housing 12 is mounted on projecting portions of a solenoid core 14. The projecting portions of the core 14 form a pair of spools about which solenoid coils 16 and 18 are respectively wrapped.

Within the core 14, a central bore 20 is formed. The central bore 20 is divided into magnetic sections 22, 24, and 26 and nonmagnetic sections 30 and 32. A first plug 34 is mounted at one end of the central bore 20 and functions as a pole piece that is magnetically connected with the section 22 of the central bore. The pole piece 34 also cooperates with an adjacent portion of the solenoid core 14 and a flange portion of inlet tube 36 to define a chamber for housing a filter 38. The outer end of the inlet tube 36 forms an inlet port 40 for connecting the valve to a pressurized supply of fuel.

A second plug 42 is mounted in the opposite end of the central bore 20 and includes an extended portion in the form of a nipple that terminates at an outlet port 44. The thruster engines of a spacecraft may be connected to the outlet port 44 for receiving fuel that passes through the valve. In addition to closing a portion of one end of the central bore, the plug 42 also functions as a stationary valve body.

A third plug designated generally at 46 divides the central bore into two separate portions. However, the third plug 46 is actually an assembly of two components, namely, stationary valve body 48 and pole piece 50.

Each of the three plugs 34, 46, and 42 include respective conduits 52, 54, and 56 that define, together with passages formed through the separate portions of the central bore, a single passageway interconnecting inlet port 40 with outlet port 44. Each of the plugs is also associated with one or more guide members that project from ends of the plugs. For example, guide member 60 projects from an end face of pole piece 34 into the central bore. A similar guide member 62 projects in the same direction from the pole piece 50. The valve bodies 42 and 48 also include respective guide members 66 and 68 that are formed as integral projections of the valve bodies into the central bore.

A first plunger 70 includes a stepped central bore 72 that is supported from opposite ends of the plunger on the outer diametral surfaces of guide members 60 and 66. A second plunger 74 also includes a stepped guide bore 76 that is similarly supported on guide members 62 and 68. Each of the plungers 70 and 74 carries with it a valve seal depicted as pucks 80 and 82. The two pucks 80 and 82 are respectively mounted within the stepped bores 72 and 76 of the plungers between the two guide members that support each plunger.

All four of the guide members 60, 62, 66, and 68 are formed as hollow guide tubes that extend the respective conduits formed through the three plugs into one or the other portions of the central bore. The guide tubes 66 and 68 also form respective valve seats 84 and 86 at one end of the respective conduits 54 and 56 in positions that locate the valve seats within the guide bores of the plungers adjacent to the respective valve seals 80 and 82.

Unlike the guide tubes 64 and 66, which are formed as integral projections of stationary valve bodies, the guide tubes 60 and 62 are movable along respective guide bores 90 and 92 formed in the pole pieces 34 and 50. The opposite ends of the guide members 60 and 62 are secured within the stepped bores of the respective plungers 70 and 72 so that the guide members move with the plungers along the central bore.

Resilient members in the form of springs 94 and 96 are captured within the respective guide tubes 60 and 62 and impinge against respective end faces 98 and 100 of the pole piece guide bores. The springs 94 and 96 urge the respective guide members 60 and 62, together with the respective plungers 70 and 74, away from the pole pieces 34 and 50 for biasing respective valve seals 80 and 82 against the valve seats 84 and 86.

Figure 2:
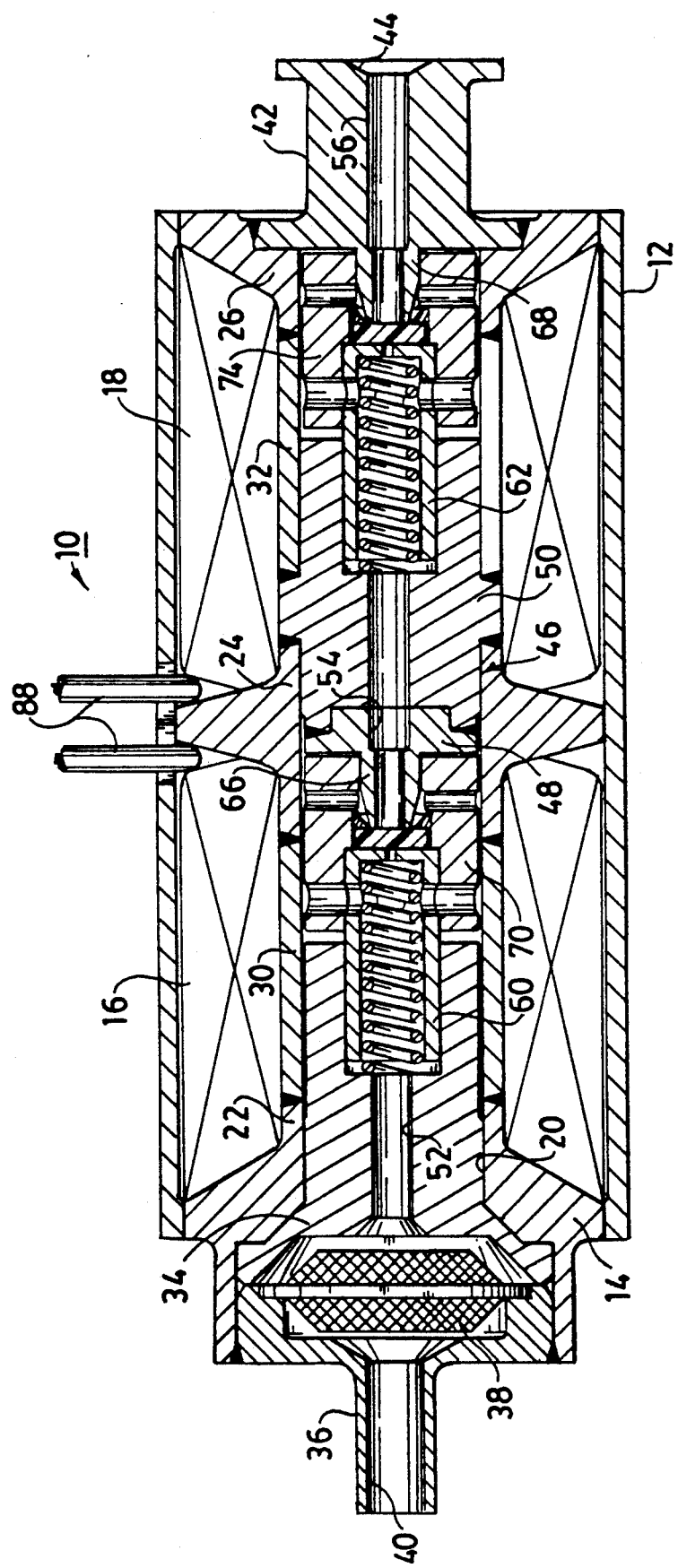
FIG. 2 is a cross-sectional view of the same valve showing its internal components in a closed position.
Figure 3:
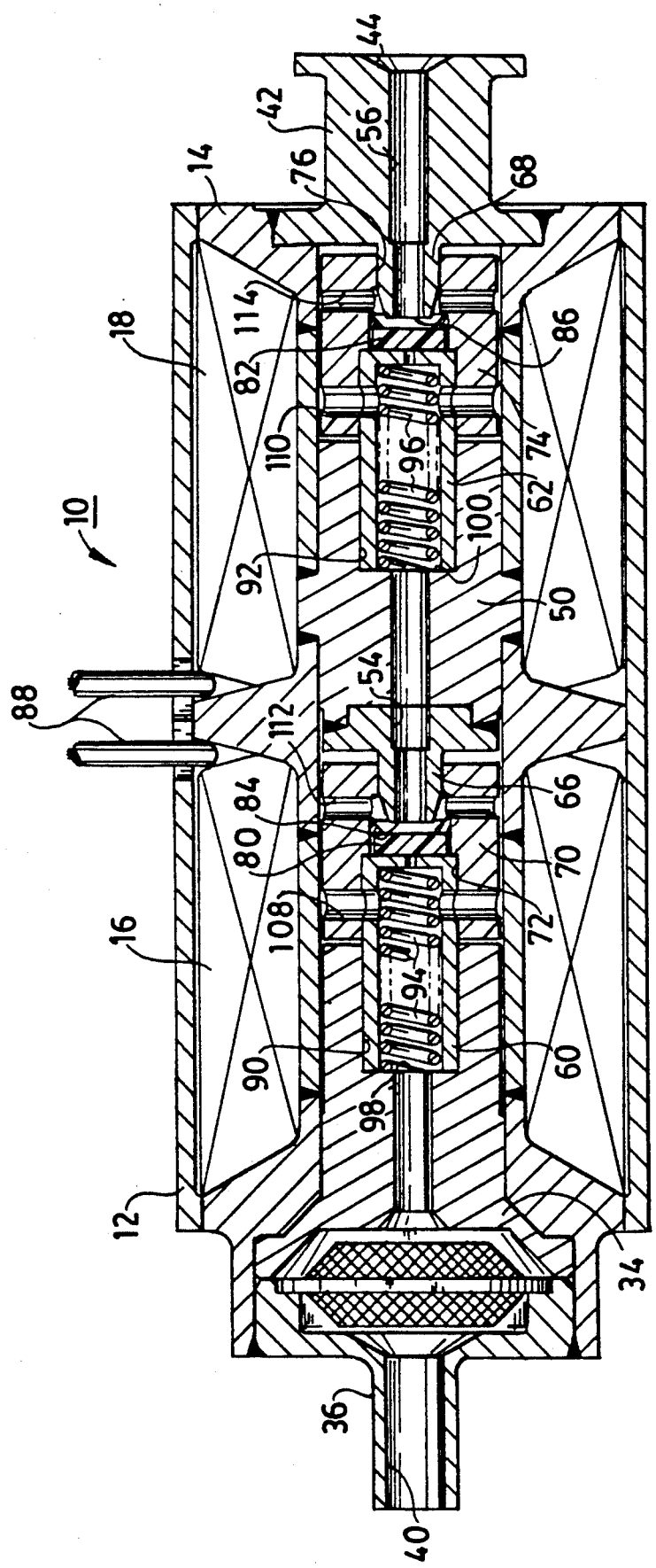
FIG. 3 is the same cross-sectional view of the valve, but showing the valve in an opened position for allowing the delivery of fuel to thruster engines.

Both of the valve seals 80 and 82 are biased to the closed position shown in FIG. 2. However, when the solenoid coils 16 and 18 are energized by current carried to the solenoid by lead wires 88, the plungers 70 and 74 are attracted toward the respective pole pieces 34 and 50 as shown in FIG. 3. Respective lengths of the guide tubes 62 and 64 are set to form respective stops against the end faces 98 and 100 of the pole piece guide bores to limit movement of the respective plungers toward the respective pole faces. The valve seals 80 and 82 are carried with the plungers away from the respective valve seats 84 and 86 to open the separate passages through the two portions of the central bore and allow the flow of fuel through the conduits connecting the separate passages to the inlet and outlet ports.

Portions of each of the passages in the central bore are formed by clearance spaces between the outer diametral surfaces 104 and 106 of the plungers with the inner diametral surfaces of the central bore 20. The conduits 52 and 54 communicate with the clearance spaces through respective conduits 108 and 110 that are formed through both the respective plungers and the guide tubes on which they are fixed. The conduits 54 and 56 also communicate with the same respective clearance spaces through other conduits 112 and 114 formed through the plunger. However, the respective valve seals and seats located within each plunger interrupt the respective connections between the conduits 54 and 56 and the conduits 112 and 114.

Inlet fuel pressure is applied against the total diametral area of one end face of the plungers. However, the exposure of the opposite end face of the plungers is reduced by the diametral area of the valve seats that are closed against the valve seals carried within the plungers. Accordingly, inlet fuel pressure applied over different diametral areas of the plunger end faces tends to further bias the valve seals against the valve seats to maintain a tight seal between them despite variations in fuel pressure. Of course, when the valve seal 82 is closed against valve seat 84, no inlet fuel pressure reaches the other valve seal 82. However, if the valve seal 80 should leak or otherwise fail, the inlet fuel pressure would also urge the valve seal 82 against the valve seat 86 to help maintain a tight seal between them. In contrast, when the valves are opened, equal diametral areas at the two end faces of each plunger are exposed to the fuel pressure.

Although it would have been possible to mount the guide tubes 60 and 62 in fixed positions within the respective pole pieces and to allow the plungers to slide with respect to these guide tubes, the presently illustrated arrangement provides better support for the plungers by using the additional lengths of the guide tubes 60 and 62 within the respective pole piece bores 90 and 92 to limit the amount the plungers can cock with respect to their guide surfaces. The guide tubes 60 and 62 also add very little mass to the plungers in comparison with extending the lengths of the plungers to provide the same lengths of guide support.

In addition, since none of the guide tubes 60, 62, 66, and 68 provide parts of the path of magnetic flux between the plungers and the pole pieces, the guide tubes may be made from a nonmagnetic resistant material. One such material that has been found to be especially effective for this purpose is Nitronic 60. The suggested material is a specialty stainless steel that includes low magnetic conductivity, corrosion resistance to thruster engine fuels, and resistance to galling. The low magnetic conductivity of the guide tube material also helps to isolate the springs 94 and 96 from communicating magnetic flux between the pole pieces and plungers.

I claim:

1. A dual series valve controlling fuel supply to thruster engines comprising:

a solenoid core having a central bore formed therein;

input and output ports of said valve formed at opposite ends of said central bore;

a first plug mounted at one of said ends of the central bore having a first conduit formed therein interconnecting said input port with said central bore;

a second plug mounted at the other of said ends of the central bore having a second conduit formed therein interconnecting said output port to said central bore;

a third plug mounted within said central bore dividing said central bore into first and second portions and having a third conduit formed therein interconnecting said first and second portions of the central bore;

a first passage within said first portion of the central bore interconnecting said first conduit with said third conduit;

a second passage within said second portion of the central bore interconnecting said second conduit with said third conduit;

a first guide member projecting from said first plug into said first portion of the central bore;

a second guide member projecting from said second plug into said second portion of the central bore;

third and fourth guide members respectively projecting from opposite ends of said third plug into said first and second portions of the central bore;

a first plunger having a first guide bore supported on said first and third guide members for movement along said first portion of the central bore between said first and third plugs;

a second plunger having a second guide bore supported on said second and fourth guide members for movement along said second portion of the central bore between said second and fourth plugs;

a first valve seal carried within said first guide bore between said first and third guide members for opening and closing said first passage interconnecting the first and third conduits;

a first valve seat forming one end of said third guide member within said first guide bore and encompassing at one end of said third conduit a first opening that is opened and closed by said first valve seal;

a second valve seal carried within said second guide bore between said second and third guide members for opening and closing said second passage interconnecting the second and third conduits; and a second valve seat forming one end of said second guide member within said second guide bore and encompassing at one end of said second conduit a second opening that is opened and closed by said second valve seal.

2. The dual series valve of claim 1 in which both of said plungers are biased by respective resilient members into positions that close said first and second openings.

3. The dual series valve of claim 2 in which said first plunger is further biased into the position that closes the first opening by inlet fuel pressure applied against said first plunger.

4. The dual series valve of claim 1 in which said first and second guide members are respectively supported from said first and second plugs and said third and fourth guide members are supported from said third plug to prevent either of said plungers from tipping into contact with said central bore.

5. The dual series valve of claim 4 in which said third plug forms a first valve body supporting said third guide member and a pole piece supporting said fourth guide member.

6. The dual series valve of claim 5 in which said first plug forms a pole piece supporting said first guide member and said second plug forms a second valve body supporting said second guide member.

7. The dual series valve of claim 6 in which said second and third guide members are formed integrally with said second and first valve bodies, respectively.

8. The dual series valve of claim 7 in which both of said plungers are guided for movement along said central bore on surfaces made from a nonmagnetic wear-resistant material.

9. The dual series valve of claim 8 in which all four of said guide members are formed from said nonmagnetic wear-resistant material.

* * * * *